United States Patent [19]

Coates et al.

[11] Patent Number: 5,171,827
[45] Date of Patent: Dec. 15, 1992

[54] PARTICULATE ACICULAR PARA-ARAMIDE

[75] Inventors: Don M. Coates, Midlothian, Va.; Patrick H. Young, Circleville, Ohio

[73] Assignee: E. I. Du Pont de Nemours and Company, Wilmington, Del.

[21] Appl. No.: 642,164

[22] Filed: Jan. 17, 1991

Related U.S. Application Data

[62] Division of Ser. No. 489,274, Mar. 5, 1990, Pat. No. 5,009,820.

[51] Int. Cl.$^5$ .............................................. C08G 69/32
[52] U.S. Cl. ..................................... 528/348; 524/606
[58] Field of Search ........................................ 528/348

[56] References Cited

U.S. PATENT DOCUMENTS

| | | | |
|---|---|---|---|
| 2,999,788 | 9/1961 | Morgan | 162/146 |
| 3,063,966 | 11/1962 | Kwolek et al. | 260/78 |
| 3,081,519 | 3/1963 | Blades et al. | 28/81 |
| 3,484,899 | 12/1969 | Smith | 18/8 |
| 4,012,461 | 3/1977 | Van Brederode | 260/878 R |
| 4,054,625 | 10/1977 | Kozlowski et al. | 264/13 |
| 4,107,243 | 8/1978 | Stearns et al. | 264/13 |
| 4,166,091 | 8/1979 | Beebe | 264/205 |
| 4,183,881 | 1/1980 | Griffin et al. | 264/13 |
| 4,211,737 | 7/1980 | Di Drusco et al. | 264/12 |
| 4,352,650 | 10/1982 | Marshall | 425/174.8 |
| 4,511,623 | 4/1985 | Yoon et al. | 428/359 |
| 4,560,743 | 12/1985 | Fujiwara et al. | 528/348 |
| 4,716,215 | 12/1987 | Matsui et al. | 528/348 |
| 4,734,227 | 3/1988 | Smith | 264/13 |
| 4,921,900 | 5/1990 | Van Trump | 524/744 |
| 5,009,820 | 4/1991 | Coates et al. | 528/348 |

*Primary Examiner*—Harold D. Anderson

[57] ABSTRACT

This invention relates to para-aramide particles. More particularly, the invention concerns a process for flash spinning such particles from a mixture of poly(paraphenylene terephthalamide), carbon dioxide and water.

1 Claim, No Drawings

PARTICULATE ACICULAR PARA-ARAMIDE

This is a division of application Ser. No. 07/489,274, filed Mar. 5, 1990, now U.S. Pat. No. 5,009,820.

BACKGROUND OF THE INVENTION

1. Field of the Invention

This invention relates to acicular para-aramide particles. More particularly, the invention concerns a process for flash spinning such particles from a mixture of poly(paraphenylene terephthalamide), carbon dioxide and water. The particles are useful for various reinforcement applications.

2. Description of the Prior Art

Para-aramids are well known for their properties of good thermal stability, high strength-to-weight ratio, and ability in the form of fibers to reinforce plastics and other materials. A particularly useful para-aramid is poly(paraphenylene terephthalamide) (PPD-T), available from E. I. du Pont de Nemours and Company in the form of continuous filament yarns, staple and pulp.

Short, discontinuous fibers are preferred for many reinforcing applications. The commercially available pulps are useful, but they tend to be expensive to produce since the process for their manufacture begins with spinning a costly continuous filament yarn, continues with a cutting operation, and concludes with a wet refining step to convert the cut filaments into pulp. These pulp fibers have diameters generally between 1 and 12 micrometers, lengths of 1,000–5,000 micrometers, and a length-to-width ratio of 125–5,000. Shorter particles are more desirable for many filling and reinforcing applications.

Flash spinning of various polymers is described in Blades et al., U.S. Pat. No. 3,081,519. Blades spins film-fibril strands, called plexifilaments, from a liquid-liquid dispersion. The patent indicates that crystalline polymers may be used, and describes many types of organic solvents and even mentions water. Neither the spinning of para-aramid polymers nor the combination of carbon dioxide/water as a solvent medium is mentioned. Further, the Blades products are generally continuous filaments and not discrete particles.

SUMMARY OF THE INVENTION

The present invention provides a process for preparing para-aramide particles by the steps of:

forming a solution medium of about 5 to 10% by weight poly(paraphenylene terephthalamide), about 15 to 25% by weight carbon dioxide, and about 70 to 85% by weight water at a temperature in the range of about 275° to 325° C. and under a pressure of about 1,000 to 3,000 psi, and passing the solution medium through an orifice into a region of lower temperature and much lower pressure to precipitate the particles.

In one embodiment of the invention the process uses a solution medium containing about 7.5% by weight poly(paraphenylene terephthalamide), about 17% by weight carbon dioxide and about 75.5% by weight water.

The invention also includes as a novel product poly(paraphenylene terephthalamide) in the form of acicular particles having a length of less than about 5 microns when dry and an aspect ratio of at least about 2. Aspect ratio means the ratio of length to diameter of a fiber or particle.

Also provided is a novel solution medium composed of about 5 to 10% by weight poly(paraphenylene terephthalamide), about 15 to 25% by weight of carbon dioxide, and about 70 to 85% water, preferably with the solution medium being maintained at a temperature in the range of about 275° to 325° C. and under a pressure of about 1,000 to 3,000 psi.

DETAILED DESCRIPTION OF PREFERRED EMBODIMENTS

The process of the invention for preparing para-aramid particles can be carried out on a batch or continuous basis. In either event a suitable vessel is charged with a powder, granules or other convenient form of poly(paraphenylene terephthalamide) and with water followed by pressurizing the mixture with carbon dioxide while it is under agitation. The temperature and pressure are preferably increased gradually or in increments, usually until the temperature is about 275° C. to 325° C. and until the pressure is higher than autogeneous pressure, generally about 1,000 to 3,000 psi.

It is surprising that the PPD-T, which is regarded as generally being very difficult to dissolve, can in fact be dissolved in an aqueous medium. While 5 to 10% by weight of the polymer should be used in the carbon dioxide/water medium, it may be found in some cases that not all of it has gone into solution since some polymer residue may be observed in the vessel after flash-spinning is completed. Hence the term "solution medium" is used herein to indicate that there may be incomplete solution of the polymer at the spinning conditions.

The spin mixture may optionally contain various usual additives such as surfactants, ultraviolet-light stabilizers, dyes and the like.

Once the heated spin mixture is thoroughly mixed and pressurized, it is then flash-spun by being passed through an orifice assembly, which may be of the kind that contains a let-down chamber, as disclosed for example in Smith, U.S. Pat. No. 3,484,899 (particularly FIG. 5), and Marshall, U.S. Pat. No. 4,352,650 (particularly FIG. 2), which disclosures are incorporated herein by reference. The spin mixture is flash-spun into a region of much lower temperature and pressure (usually ordinary room temperature and pressure) than exists upstream of the spin orifice. As a result, some of the liquid medium is flash evaporated and the particulate PPD-T is generated. Not all of the water is necessarily flash evaporated, in which event the particles are collected in the form of a slurry, which then must be filtered to remove and recover the particles. The slurry so obtained will usually appear as a grey-colored aqueous suspension in which the particles, under magnification, exhibit the characteristic golden color of PPD-T fibers.

The particles are usually acicular in shape, have a length of less than about 5 microns when dry and an aspect ratio of at least 2, usually at least 3. The particles when examined under a microscope are needle-like in appearance and can resemble micro-fibers or micro-fibrils. When recovered from the aqueous slurry, they are generally agglomerated into larger particles, usually of about 10 microns or so in cross-section.

The PPD-T particles produced in accordance with the invention are useful in a variety of applications to reinforce plastics and other materials. For many purposes they can replace the commercially available pulp fibers that are widely used in industry. They can be used for example to increase the thermal degradation temperature of polylactide, as a replacement for carbon black in a typical rubber formulation, as a replacement for asbestos or other fibrous components of friction products such as automotive brake and clutch pads, and as a viscosity modifier for paints and oils.

In the following examples, parts and percentages are by weight unless otherwise indicated.

EXAMPLE 1

This example describes the preparation of acicular poly(paraphenylene terephthalamide) particles by flash spinning a mixture of the polymer (7.5%) from water (75.5%) and carbon dioxide (17.0%).

A one gallon (3.8 liter) pressure vessel is loaded with 2 liters of distilled water and 200 grams of wet poly(paraphenylene terephthalamide) prepared by the general process described in Kwolek, U.S. Pat. No. 3,063,966. The vessel is then pressurized with carbon dioxide to 500 psi and heated to 300° C. over a period of 30 to 60 minutes while being stirred with a paddle wheel agitator. The vessel is further pressurized to 2,000 psi with more carbon dioxide. This procedure results in typically 450 g of carbon dioxide being added. The vessel is maintained at these conditions for 2 hours with constant stirring. Stirring is stopped and the pressurized solution medium is released through the orifice of a needle valve into a beaker. The liquid slurry obtained is filtered through #4 Watmann filter paper and the collected particles washed with distilled water and dried.

Following filtration and drying, the particles are examined by a microscope and most of the particles are seen to be up to about 5 microns in length. They have aspect ratios averaging about 3:1. Many of the individual acicular particles have agglomerated into larger, generally spherical particles. The agglomerates have an average particle diameter, based on measuring more than 30 particles of about 8.5 micrometers prior to drying and 4.5 micrometers after drying. The surface area of the agglomerated particles is about 5.3 square meters per cc.

EXAMPLE 2

The procedure of Example 1 is used but the final pressure inside the vessel just prior to release of the solution is varied over a series of runs from between about 1,000 to about 3,000 psi. Particles are obtained similar to those of Example 1. The smallest particles are obtained at about 2,000 psi.

What is claimed is:

1. Poly(paraphenylene terephthalamide) in the form of acicular particles having a length of less than about 5 microns when dry and a ratio of particle length to particle diameter of at least about 2.

* * * * *